United States Patent
Huang et al.

(10) Patent No.: US 10,915,723 B2
(45) Date of Patent: Feb. 9, 2021

(54) DISPLAY DEVICE, DISPLAY PANEL, MANUFACTURING METHOD THEREOF, AND DRIVING METHOD THEREOF

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Weiyun Huang, Beijing (CN); Benlian Wang, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/332,508

(22) PCT Filed: Aug. 10, 2018

(86) PCT No.: PCT/CN2018/099995
§ 371 (c)(1),
(2) Date: Mar. 12, 2019

(87) PCT Pub. No.: WO2019/037609
PCT Pub. Date: Feb. 28, 2019

(65) Prior Publication Data
US 2019/0266379 A1 Aug. 29, 2019

(30) Foreign Application Priority Data
Aug. 25, 2017 (CN) .......................... 2017 1 0743103

(51) Int. Cl.
*G06K 9/00* (2006.01)
*G06F 21/32* (2013.01)
(Continued)

(52) U.S. Cl.
CPC .......... *G06K 9/00013* (2013.01); *G06F 21/32* (2013.01); *G06K 9/00* (2013.01); *G09F 9/33* (2013.01); *H01L 27/32* (2013.01)

(58) Field of Classification Search
CPC ........ G06K 9/00013; G06K 9/00; G06K 9/33; G06F 21/32; H01L 27/32
See application file for complete search history.

(56) References Cited

U.S. PATENT DOCUMENTS

2010/0007632 A1* 1/2010 Yamazaki ............... G06F 21/32
345/175
2017/0262022 A1* 9/2017 Choi ..................... G02B 5/3025
(Continued)

FOREIGN PATENT DOCUMENTS

| CN | 104036172 A | 9/2014 |
|----|-------------|--------|
| CN | 105786102 A | 7/2016 |

(Continued)

OTHER PUBLICATIONS

Search Report and Written Opinion for International Application No. PCT/CN2018/099995 dated Nov. 19, 2018.
(Continued)

*Primary Examiner* — Stephen G Sherman
(74) *Attorney, Agent, or Firm* — Calfee, Halter & Griswold LLP

(57) ABSTRACT

A display panel includes: a substrate including a first substrate area and a second substrate area; and a display area disposed in the first substrate area and including a plurality of sub-pixels and a fingerprint sensing area, the fingerprint sensing area including a photic hole and a light emitting unit; a fingerprint imaging area disposed in the second substrate area and aligned with the fingerprint sensing area, and configured to receive an optical signal emitted by the light emitting unit, reflected by a fingerprint and passing through the photic hole, and convert the optical signal into an (Continued)

electrical signal; and a fingerprint recognition circuit connected to the fingerprint sensing area and configured to generate a corresponding fingerprint image signal based on the electrical signal output by the fingerprint imaging area.

18 Claims, 5 Drawing Sheets

(51) Int. Cl.
*G09F 9/33* (2006.01)
*H01L 27/32* (2006.01)

(56) References Cited

U.S. PATENT DOCUMENTS

2018/0285619 A1* 10/2018 Kim .................... G09G 3/3208
2019/0043420 A1* 2/2019 Jung .................... G06K 9/0004

FOREIGN PATENT DOCUMENTS

| CN | 106845451 A | 6/2017 |
| CN | 106847872 A | 6/2017 |
| CN | 104036172 B | 8/2017 |
| JP | 2005346238 A | 12/2005 |
| JP | 4743579 B2 | 8/2011 |

OTHER PUBLICATIONS

First Office Action for Chinese Patent Application No. 201710743103.0 dated Oct. 9, 2019.

* cited by examiner

DISPLAY DEVICE, DISPLAY PANEL, MANUFACTURING METHOD THEREOF, AND DRIVING METHOD THEREOF

CROSS REFERENCE TO RELATED APPLICATIONS

The present application is based upon International Application No. PCT/CN2018/099995, filed on Aug. 10, 2018, which claims priority of Chinese patent application No. 201710743103.0, filed on Aug. 25, 2017, the entire disclosure of which is hereby incorporated by reference as a part of the present application.

TECHNICAL FIELD

The present disclosure relates to the field of display technology, and more particularly to a display device, a display panel, a manufacturing method thereof, and a driving method thereof.

BACKGROUND

At present, fingerprint recognition technology has been widely used in various smart terminals. Since the fingerprint recognition function provides more convenience and security for people to operate smart terminals, it has gradually become an indispensable function in various intelligent terminals.

In the existing display technology, a fingerprint recognition area is provided with a fingerprint recognition sensor, and the fingerprint recognition sensor is connected with an external fingerprint recognition circuit. When the finger touches in the fingerprint recognition area, the fingerprint recognition sensor sends the collected fingerprint information to the fingerprint recognition circuit, and the fingerprint recognition circuit processes the fingerprint information to implement the fingerprint recognition function.

It should be noted that the information disclosed in the Background section above is only for enhancement of understanding of the background of the present disclosure, and thus may include information that does not constitute prior art known to those of ordinary skill in the art.

SUMMARY

According to one aspect of the present disclosure, there is provided a display panel, including:

a flexible substrate including a bending area and a first substrate area and a second substrate area respectively disposed on two sides of the bending area;

a display area disposed in the first substrate area and includes a plurality of sub-pixels and a fingerprint sensing area, the fingerprint sensing area including a photic hole and a light-emitting unit;

a fingerprint imaging area disposed in the second substrate area, wherein in the case where the bending area is in a bent sate, the fingerprint imaging area is aligned with the fingerprint sensing area, and the fingerprint imaging area is configured to receive an optical signal emitted by the light emitting unit, reflected by a fingerprint and passing through the photic hole, and convert the optical signal to an electrical signal; and a fingerprint recognition circuit connected to the fingerprint sensing area and configured to generate a corresponding fingerprint image signal based on the electrical signal output by the fingerprint imaging area.

In an exemplary embodiment of the present disclosure, the light emitting unit includes a plurality of the sub-pixels.

In an exemplary embodiment of the present disclosure, the photic hole includes a transparent area distributed around a periphery of an area where the sub-pixels are disposed in the display area.

In an exemplary embodiment of the present disclosure, the fingerprint imaging area includes a photoelectric conversion unit, and photoelectric conversion unit includes polysilicon, amorphous silicon or indium gallium zinc oxide.

In an exemplary embodiment of the present disclosure, the fingerprint recognition circuit is disposed on a flexible circuit board.

In an exemplary embodiment of the present disclosure, an area of the fingerprint imaging area is larger than or equal to an area of the fingerprint sensing area.

In an exemplary embodiment of the present disclosure, the light emitting unit is an organic light emitting diode unit or a quantum dot light emitting unit.

In an exemplary embodiment of the present disclosure, each of a shape of the fingerprint sensing area and a shape of the fingerprint imaging area includes one of a circle, a rectangle, or an ellipse.

According to one aspect of the present disclosure, there is provided a display device including any of the display panel described above.

According to one aspect of the present disclosure, there is provided a manufacturing method of a display panel, including:

providing a flexible substrate having a first substrate area, a bending area, and a second substrate area, wherein the first substrate area and the second substrate area are respectively disposed at two sides of the bending area;

forming a plurality of sub-pixels including thin film transistors in the first substrate area to form a display area;

forming a fingerprint sensing area including a photic hole and a light emitting unit in the display area; and forming a photoelectric conversion unit corresponding to the fingerprint sensing area in the second substrate area to form a fingerprint imaging area, so that the fingerprint sensing area is aligned with the fingerprint imaging area after the bending area is bent.

In an exemplary embodiment of the present disclosure, the photoelectric conversion unit and at least a part of the film layers of the thin film transistors are formed in the same patterning process.

In an exemplary embodiment of the present disclosure, the light emitting unit includes a plurality of sub-pixels.

In an exemplary embodiment of the present disclosure, the photic hole includes a transparent area distributed outside an area where the sub-pixels are disposed.

According to one aspect of the present disclosure, there is provided a driving method of a display panel, for driving any of the display panel described above, wherein the driving method includes:

providing a driving signal to the light emitting unit to drive the light emitting unit to emit light;

receiving, by the fingerprint imaging area, an optical signal emitted by the light emitting unit, reflected by a fingerprint and passing through the photic hole, and converting the optical signal into an electrical signal; and generating a corresponding fingerprint image signal by the fingerprint recognition circuit based on the electrical signal.

According to one aspect of the present disclosure, there is provided a fingerprint recognition substrate including:

a substrate including a bending area and a first substrate area and a second substrate area respectively disposed at two sides of the bending area;

a fingerprint sensing area disposed in the first substrate area, the fingerprint sensing area including a photic hole; and a fingerprint imaging area, disposed in the second substrate area, wherein in the case where the bending area is in a bent state, an orthographic projection of the fingerprint sensing area on the second substrate area at least partially overlaps with the fingerprint imaging area, and the fingerprint imaging area is configured to receive an optical signal reflected by a fingerprint and passing through the photic hole, and convert the optical signal into an electrical signal.

In an exemplary embodiment of the present disclosure, the fingerprint recognition substrate further includes a light emitting unit, wherein an optical signal emitted by the light emitting unit is received by the fingerprint imaging area through the photic hole after the optical signal is reflected by a fingerprint.

In an exemplary embodiment of the present disclosure, the fingerprint imaging area includes a photoelectric conversion unit, and the photoelectric conversion unit includes polysilicon, amorphous silicon or indium gallium zinc oxide.

In an exemplary embodiment of the present disclosure, the fingerprint recognition circuit is disposed on a flexible circuit board.

In an exemplary embodiment of the present disclosure, an area of the fingerprint imaging area is larger than or equal to an area of the fingerprint sensing area.

In an exemplary embodiment of the present disclosure, the light emitting unit is an organic light emitting diode unit or a quantum dot light emitting unit.

In an exemplary embodiment of the present disclosure, each of a shape of the fingerprint sensing area and a shape of the fingerprint imaging area includes one or more of a circle, a rectangle, or an ellipse.

According to one aspect of the present disclosure, there is provided a manufacturing method of a display panel, including:

providing a flexible substrate having a first substrate area, a bending area, and a second substrate area, wherein the first substrate area and the second substrate area are respectively located at two sides of the bending area;

forming a fingerprint sensing area including a photic hole in the first substrate area;

forming a fingerprint imaging area in the second substrate area, such that in the case where the bending area is in a bent state, an orthographic projection of the fingerprint sensing area on the second substrate area at least partially overlaps the fingerprint imaging area, wherein the fingerprint imaging area is configured to receive an optical signal through the photic hole after the optical signal is reflected by a fingerprint, and convert the optical signal into an electrical signal.

In an exemplary embodiment of the present disclosure, the manufacturing method of a display panel further includes forming a light emitting unit, wherein an optical signal emitted by the light emitting unit is received by the fingerprint imaging area through the photic hole after the optical signal is reflected by a fingerprint.

In an exemplary embodiment of the present disclosure, an area of the fingerprint imaging area is larger than or equal to an area of the fingerprint sensing area.

It should be understood that the above general description and the following detailed description are intended to be illustrative and not restrictive.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. It is apparent that the drawings in the following description are only some of the embodiments of the present disclosure, and other drawings may be obtained by those skilled in the art from these drawings without paying creative effort.

DETAILED DESCRIPTION

Figure 1:
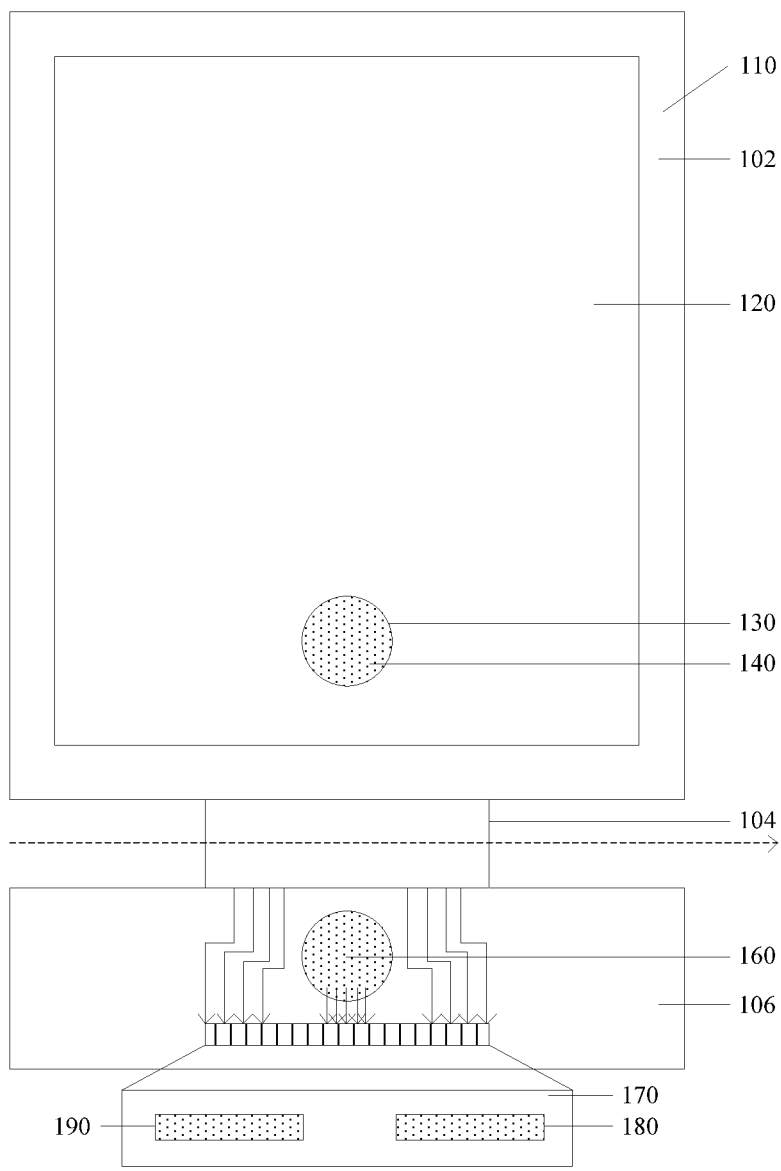
FIG. 1 illustrates a schematic diagram of a display panel according to an exemplary embodiment of the present disclosure.

Exemplary embodiments will now be described more fully with reference to the accompanying drawings. However, the exemplary embodiments can be embodied in a variety of forms and should not be construed as being limited to the examples set forth herein; rather, these embodiments are provided to make the present disclosure to be more complete and thorough, to fully convey the concept of the exemplary embodiments to those skilled in the art. The described features, structures, or characteristics may be combined in any suitable manner in one or more embodiments. In the following description, numerous specific details are set forth to provide a thorough understanding of the embodiments of the present disclosure. However, one skilled in the art will appreciate that one or more of the specific details may be omitted or other methods, components, devices, steps, etc. may be employed. In other instances, well-known technical solutions are not shown or described in detail to avoid obscuring aspects of the present disclosure.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily have to correspond to physically or logically separate entities. These functional entities may be implemented in software, or implemented in one or more hardware modules or integrated circuits, or implemented in different network and/or processor devices and/or microcontroller devices.

In an exemplary embodiment of the present disclosure, a display panel is first provided. Referring to FIG. 1, the display panel may include a flexible substrate 110 including a bending area 104 and a first substrate area 102 and a second substrate area 106 respectively disposed at two sides of the bending area 104; a display area 120, disposed in the first substrate area 102 and including a plurality of sub-pixels and a fingerprint sensing area 130, the fingerprint sensing area 130 including a photic hole 140 and a light-emitting unit; a fingerprint imaging area 160 disposed in the second substrate area 106, and aligned with the fingerprint sensing area 130 after the bending area 104 is bent, and configured to receive an optical signal emitted by the light emitting unit, reflected by a fingerprint and passing through the photic hole 140, and convert the optical signal into an electrical signal; and a fingerprint recognition circuit 180 coupled to the fingerprint sensing area 160 and configured to generate a corresponding fingerprint image signal based on the electrical signal output by the fingerprint imaging area 160.

In the display panel according to the exemplary embodiment of the present disclosure, on the one hand, the display area including the fingerprint sensing area and the fingerprint imaging area are disposed on the same flexible substrate, and the fingerprint imaging area can be made aligned with the fingerprint sensing area after the bending area is bent, which can increase the integration degree of the display panel and make the display panel lighter and thinner. On the other hand, by converting an optical signal reflected by a fingerprint and passing through the hole into an electrical signal in the fingerprint imaging area, and processing the electrical signal to form a fingerprint image signal by the fingerprint recognition circuit, it can implement fingerprint recognition based on the principle of pinhole imaging. On yet another hand, since at least part of the film layers of the display area and the fingerprint imaging area can be formed in the same patterning process, the manufacturing process can be simplified and the manufacturing cost can be reduced.

Hereinafter, the display panel in the exemplary embodiment of the present disclosure will be described in detail.

Referring to FIG. 1, in the exemplary embodiment of the present disclosure, the flexible substrate 110 is a transparent flexible substrate, and the flexible substrate 110 includes a bending area 104 and a first substrate area 102 above the bending area 104 and a second substrate area 106 below the bending area 104 respectively. A display area 120 is disposed on the first substrate area 102. The display area 120 includes a plurality of sub-pixels for displaying. A fingerprint sensing area 130 is further disposed in the display area 120. The fingerprint sensing area 130 includes a plurality of photic holes 140 and a light emitting unit, and the light emitting unit is configured to provide a light source for fingerprint recognition. The plurality of photic holes 140 may not actually through holes penetrating the transparent flexible substrate, but may represent transparent areas or blank areas in which the light rays can pass freely in the fingerprint sensing area 130, that is, the photic holes 140 are transparent areas distributed outside the area where the sub-pixels are disposed. The purpose of providing the photic holes 140 is to utilize the principle of pinhole imaging to implement imaging. Since the aperture of the photic hole 140 is small, the image information collected through the photic hole 140 is relatively large, and the photic holes 140 do not affect the normal display of the display area.

It should be noted that, in an exemplary embodiment of the present disclosure, when the plurality of sub-pixels are Organic Light-Emitting Diodes (OLEDs) or Quantum Dot Light Emitting Diodes (QLEDs), the light emitting unit of the fingerprint sensing area 130 may also be an OLED or a QLED correspondingly, but the exemplary embodiment of the present disclosure is not limited thereto, and the light emitting unit in the fingerprint sensing area 130 may also be other suitable light sources, such as a point light source specially arranged in the display panel, which is also within the scope of the present disclosure.

Still referring to FIG. 1, the fingerprint imaging area 160 is disposed on the second substrate area 106 below the bending area 104 and can be aligned with the fingerprint sensing area 130 after the bending area 104 is bent. The fingerprint imaging area 160 includes a plurality of photo-electric conversion units configured to receive an optical signal emitted by the light emitting unit, reflected by a fingerprint and passing through the photic hole 140 and convert the optical signal into an electrical signal. In addition, the second substrate area 106 is also connected (e.g., electrically connected) to the flexible circuit board 170, and the flexible circuit board 170 is provided with a fingerprint recognition circuit 180 and a display driving circuit 190. The fingerprint recognition circuit 180 is connected (e.g., electrically connected) to the fingerprint sensing area 160 and configured to generate a corresponding fingerprint image signal based on the electrical signal output by the fingerprint imaging area 160. The display driving circuit 190 is connected (e.g., electrically connected) to the display area 120, and configured to drive a plurality of sub-pixels in the display area 120 for display. As shown in FIG. 1, the circuit lines of the display area 120 are connected (e.g., electrically connected) to the flexible circuit board 170 and the display driving circuit 190 bypassing the fingerprint imaging area 160.

Figure 2:
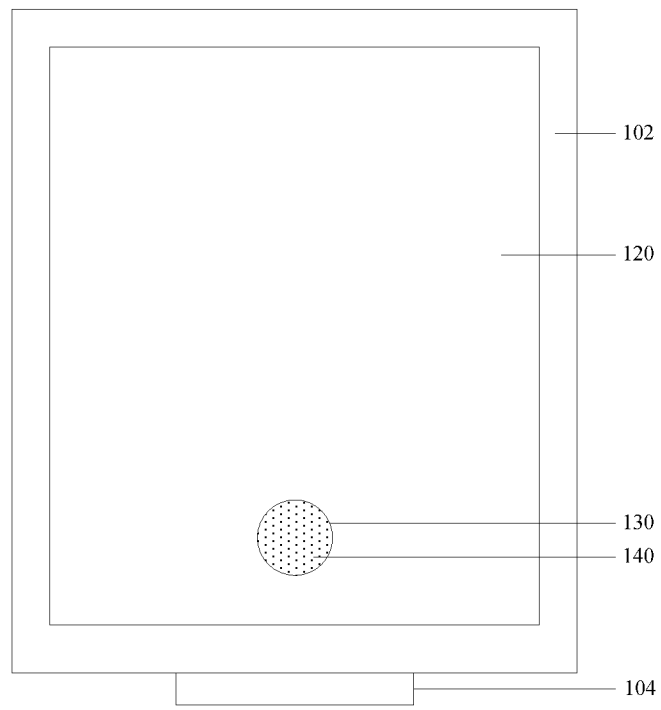
FIG. 2 illustrates a front view of the display panel shown in FIG. 1 after being bent.

It should be noted that, in an exemplary embodiment of the exemplary embodiment, each of the shape of the fingerprint sensing area 130 and the shape of the fingerprint imaging area 160 shown in FIG. 1 is circular, but the exemplary embodiment of the present disclosure is not limited thereto. For example, the shape of the fingerprint sensing area 130 and the shape of the fingerprint imaging area 160 may also be a shape such as a rectangle or an ellipse, which is not specifically limited in the present disclosure. Further, the bending area 104 can be bent along a dashed line in the middle of the bending area 104. FIG. 2 illustrates a front view of the display panel after the bending area 104 is bent. In FIG. 2, the fingerprint imaging area 160 is disposed rearward of and aligned with the fingerprint sensing area 130. In an exemplary embodiment of the present disclosure, after the bending area 104 is bent, the fingerprint sensing area 130 may coincide with the fingerprint imaging area 160. In particular, in order to ensure that the fingerprint imaging area 160 can completely receive the light passing through the photic holes in the fingerprint sensing area 130, the area of the fingerprint imaging area 160 may be provided as larger than the area of the fingerprint sensing area 130. That is, the area of the fingerprint imaging area 160 is larger than or equal to the area of the fingerprint sensing area 130.

In addition, it should also be understood that in the embodiment, the first substrate area 102 and the second substrate area 106 are connected to each other via the bending area 104, and the fingerprint sensing area 130 is made aligned with the fingerprint imaging area 160 when the bending area 104 is bent. However, the present disclosure is not limited thereto, and in other embodiments of the present disclosure, the bending area 104 may be omitted. For example, in one embodiment, the first substrate area 102 and the second substrate area 106 may be divided into separate substrates along a dashed line in the middle of the bending area 104, and the two separate substrates may be overlapped to make the fingerprint sensing area 130 aligned with the fingerprint imaging area 160. In other embodiments of the present disclosure, the first substrate area 102 and the second substrate area 106 may also be fabricated separately, and the separately fabricated substrates may be overlapped to make the fingerprint sensing area 130 aligned with the fingerprint imaging area 160. In the case where the first substrate area 102 and the second substrate area 106 are separate substrates, the first substrate area 102 and the second substrate area 106 may be connected to each other through a FPC (flexible circuit board), vias, connection terminals, and the like.

Figure 3:
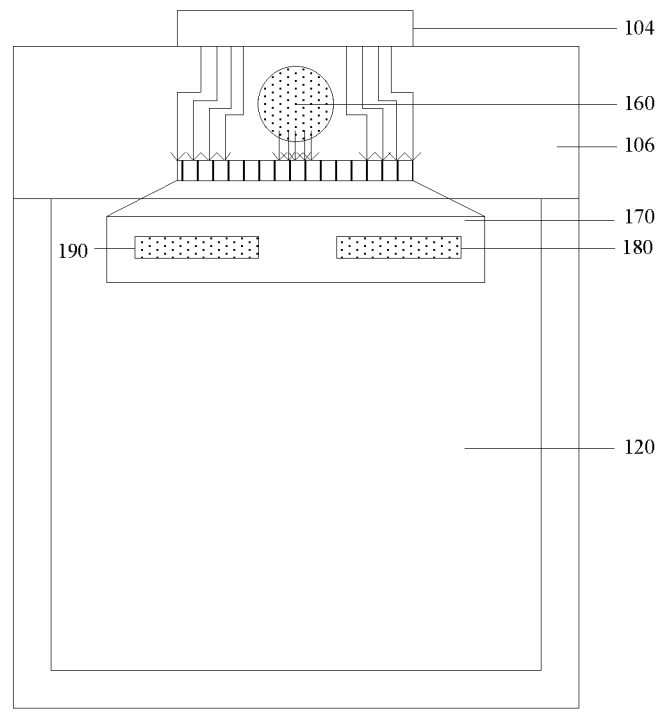
FIG. 3 illustrates a schematic rear view of the display panel shown in FIG. 1 after being bent.

FIG. 3 illustrates a schematic rear view of the display panel after the first substrate area 102 and the second substrate area 106 are bent. In FIG. 3, fingerprint imaging area 160 is formed in the second substrate area 106 of the flexible substrate. The fingerprint imaging area 160 may be formed by exposure development etching together with the plurality of sub-pixels of the display area 120. The fingerprint imaging area 160 includes a plurality of tiny photoelectric conversion units. The photoelectric conversion units are disposed corresponding to the photic holes 140 in the fingerprint sensing area 130 and configured to collect optical signals that pass through the photic holes 140 after being reflected by a fingerprint. The photoelectric conversion unit can convert the collected optical signal into an electrical signal and output the electrical signal to the fingerprint recognition circuit 180. The circuit lines of the photoelectric conversion units of the fingerprint imaging area 160 are connected to the flexible circuit board 170 and the fingerprint recognition circuit 180.

Figure 4:
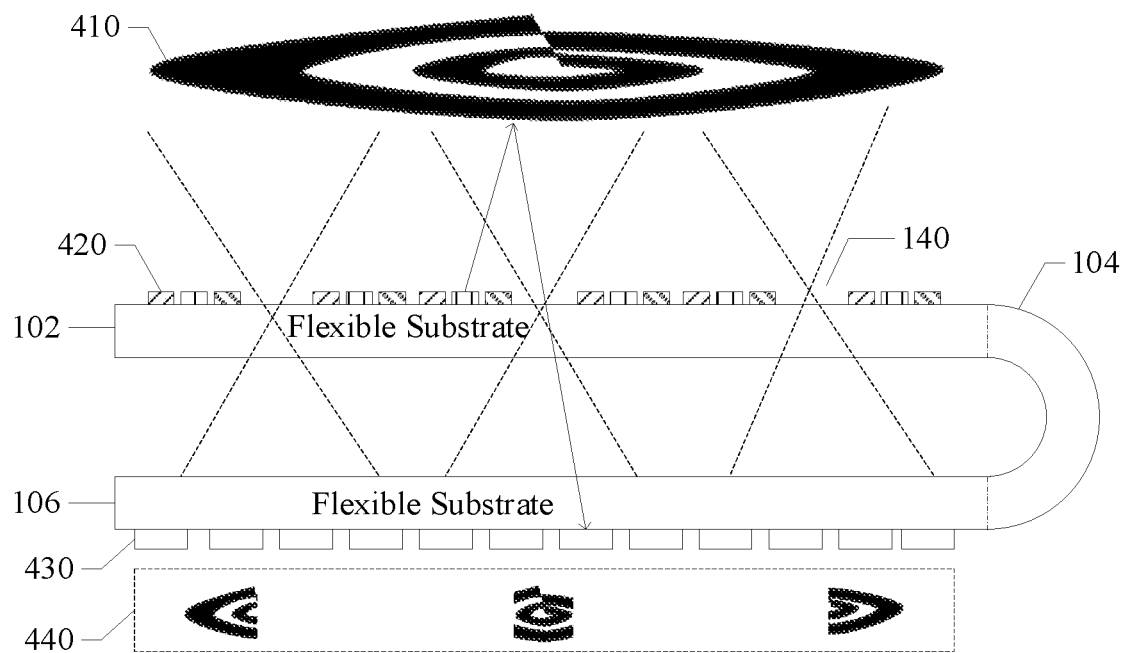
FIG. 4 illustrates a schematic structural diagram of a fingerprint sensing area and a fingerprint imaging area according to an illustrative example of the present disclosure.

Further, FIG. 4 illustrates a stacked structure diagram of the fingerprint sensing area 130 and the fingerprint imaging area 140 according to an exemplary embodiment of the present disclosure. In FIG. 4, a plurality of sub-pixels 420 are formed above the fingerprint sensing area 130 on the first substrate area 102. The plurality of sub-pixels 420 may be active light emitting units such as OLEDs or QLEDs. That is, the plurality of sub-pixels 420 may be used as a light source for fingerprint recognition. Blank areas between the plurality of sub-pixels 420 may be formed as the photic holes 140, and each of the photic holes 140 is disposed corresponding to one of the plurality of photoelectric conversion units 430 below the second substrate area 106 to form a fingerprint information collecting module. The plurality of photoelectric conversion units 430 and the plurality of sub-pixels 420 may be molded together on the flexible substrate. That is, at least a part of the film layers of the photoelectric conversion units 430 and the sub-pixels 420 may be formed in the same patterning process. Therefore, after the bending area 104 is bent, the photoelectric conversion units 430 are disposed below the flexible substrate.

Still referring to FIG. 4, the light emitted by the plurality of sub-pixels 420 is reflected by a fingerprint 410, and is irradiated onto the photoelectric conversion units 430 through the photic holes 140. The photoelectric conversion unit 430 converts the optical signal including the fingerprint information based on the pinhole imaging into an electrical signal. Then, the electrical signal is subject to image synthesis processing 440 by the fingerprint recognition circuit 180 to synthesize the images of the respective photic holes 140 into fingerprint image information. Taking the three-part fingerprint image collected from the three photic holes in FIG. 4 as an example, in the image synthesis processing 440, the three-part image signal including the partial fingerprint information formed by the three photic holes 140 is processed, to synthesis the three pieces of partial fingerprint information to form a fingerprint image signal corresponding to the fingerprint 410.

Figure 5:
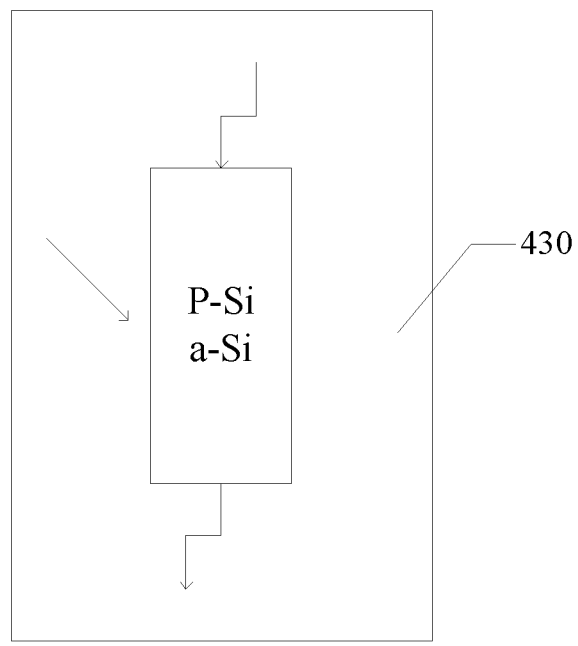
FIG. 5 illustrates a schematic diagram of a principle of a photoelectric conversion unit according to an exemplary embodiment of the present disclosure.

FIG. 5 illustrates a schematic diagram of a photoelectric conversion principle according to the present exemplary embodiment. As shown in FIG. 5, the photoelectric characteristics of photons that increase the semiconductor mobility, that is, the excitation of photons causing the current of the photoelectric conversion unit 430 to change is utilized. The current change is fed back to the fingerprint recognition circuit 180. The fingerprint recognition circuit 180 performs the image synthesis processing 440 on the electrical signal from each photoelectric conversion unit 430 which corresponds to the optical signal, to form a fingerprint image signal corresponding to the fingerprint 410 for fingerprint recognition. In an exemplary embodiment of the present disclosure, the material of the photoelectric conversion unit includes a material such as a P—Si semiconductor, an a-Si semiconductor, or an IGZO semiconductor, which is not specifically limited in the present disclosure.

Figure 6:
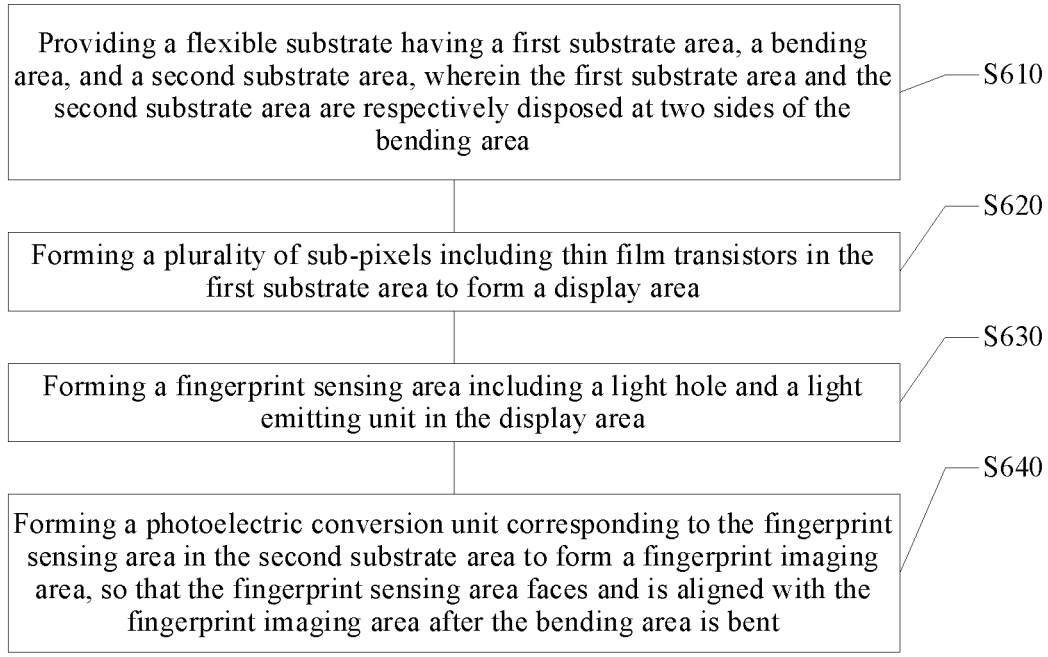
FIG. 6 illustrates a flow chart of a manufacturing method of a display panel according to an exemplary embodiment of the present disclosure.

Further, in another exemplary embodiment of the present disclosure, a manufacturing method of a display panel is also provided. Referring to FIG. 6, the manufacturing method of a display panel may include the following.

In item S610, a flexible substrate having a first substrate area, a bending area, and a second substrate area is provided, wherein the first substrate area and the second substrate area are respectively disposed at two sides of the bending area.

In item S620, a plurality of sub-pixels including thin film transistors are formed in the first substrate area to form a display area.

In item S630, a fingerprint sensing area including a photic hole and a light emitting unit is formed in the display area.

In item S640, a photoelectric conversion unit corresponding to the fingerprint sensing area is formed in the second substrate area to form a fingerprint imaging area, so that the fingerprint sensing area is aligned with the fingerprint imaging area after the bending area is bent.

In the embodiment, the photoelectric conversion units and at least a part of the film layers of the thin film transistors are formed in the same patterning process.

In addition, it should also be understood that in the present embodiment, the first substrate area 102 and the second substrate area 106 are connected to each other via the bending area 104, and the fingerprint sensing area 130 is made aligned with the fingerprint imaging area 160 when the bending area 104 is bent. However, the present disclosure is not limited thereto, and in other embodiments of the present disclosure, the bending area 104 may be omitted. For example, in one embodiment, the first substrate area 102 and the second substrate area 106 may be divided into separate substrates along a dashed line in the middle of the bending area 104, and the two separate substrates may be overlapped to make the fingerprint sensing area 130 aligned with the fingerprint imaging area 160. In other embodiments of the present disclosure, the first substrate area 102 and the second substrate area 106 may also be fabricated separately, and the separately fabricated substrates may be overlapped to make the fingerprint sensing area 130 aligned with the fingerprint imaging area 160. In the case where the first substrate area 102 and the second substrate area 106 are separate substrates, the first substrate area 102 and the second substrate area 106 may be connected to each other through a FPC (flexible circuit board), vias, connection terminals, and the like.

In the manufacturing method of a display panel according to the exemplary embodiment of the present disclosure, on the one hand, the display area including the fingerprint sensing area and the fingerprint imaging area are disposed on the same flexible substrate, and the fingerprint imaging area can be made aligned with the fingerprint sensing area after the bending area is bent, which can increase the integration degree of the display panel and make the display panel lighter and thinner. On the other hand, since at least part of the film layers of the thin film transistors and the photoelectric conversion units can be formed in the same patterning process, the manufacturing process can be simplified and the manufacturing cost can be reduced.

In an exemplary embodiment of the present disclosure, the photoelectric conversion units and at least a part of the film layers of the thin film transistors are formed in the same patterning process, which may include: a semiconductor material layer of the photoelectric conversion unit and a partial film layer of the thin film transistor of the display, such as an active layer are formed in the same patterning process. For example, when the material of the photoelectric conversion unit is P—Si (polycrystalline-Si, polysilicon), and the thin film transistor of the display area is a P—Si TFT (Thin Film Transistor), the P—Si film layer of the photoelectric conversion unit can be formed in the same patterning process as the active layer of the P—Si TFT. When the material of the photoelectric conversion unit is a-Si (amorphous-Si, amorphous silicon), and the thin film transistor of the display area is an a-Si TFT, the a-Si film layer of the photoelectric conversion unit can be formed in the same patterning process as the a-Si film layer of the a-Si TFT. When the material of the photoelectric conversion unit is IGZO (Indium Gallium Zinc Oxide), and the thin film transistor of the display area is an IGZO TFT, the IGZO film layer of the photoelectric conversion unit can be formed in the same patterning process as the IGZO layer of the IGZO TFT. However, those skilled in the art will readily understand that other film layers of the photoelectric conversion unit, such as metal layers, can also be formed in the same patterning process as the metal layers in the thin film transistor, which are all within the scope of the present disclosure.

Further, in an exemplary embodiment of the present disclosure, the light emitting unit includes a plurality of the sub-pixels.

Further, in an exemplary embodiment of the present disclosure, the photic hole includes a transparent area distributed outside the area where the sub-pixels are disposed.

Further, in an exemplary embodiment of the present disclosure, the material of the photoelectric conversion unit includes a P—Si semiconductor, an a-Si semiconductor, or an IGZO semiconductor.

Further, in an exemplary embodiment of the present disclosure, the area of the fingerprint imaging area is larger than or equal to the area of the fingerprint sensing area.

Further, in an exemplary embodiment of the present disclosure, the light emitting unit is an OLED unit or a QLED unit.

In addition, in an exemplary embodiment of the present disclosure, a driving method of a display panel is further provided for driving the display panel in the above exemplary embodiments, and the driving method may include:

providing a driving signal to the light emitting unit to drive the light emitting unit to emit light;

receiving, by the fingerprint imaging area, an optical signal emitted by the light emitting unit, reflected by a fingerprint and passing through the photic hole, and converting the optical signal into an electrical signal; and generating a corresponding fingerprint image signal by the fingerprint recognition circuit based on the electrical signal.

Since the specific implementation of the driving method has been described in detail in the description of the display panel in the above exemplary embodiments, it will not be repeated herein.

Further, in an exemplary embodiment of the present disclosure, there is further provided a display device including the display panel according to the above embodiments. Since the display device in the exemplary embodiment of the present disclosure employs the above display panel, it has at least all the advantages corresponding to the display panel. In an exemplary embodiment, the display device may be: an OLED display device, a mobile phone, a tablet computer, a television, a display, a notebook computer, a digital camera, and the like, or any product or component having a display function, which is not specifically limited by the present disclosure.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the appended claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A display panel, comprising:
   a flexible substrate comprising a bending area and a first substrate area and a second substrate area respectively disposed on two sides of the bending area;
   a display area disposed in the first substrate area and comprising a plurality of sub-pixels and a fingerprint sensing area, the fingerprint sensing area comprising a photic hole and a light-emitting unit;
   a fingerprint imaging area disposed in the second substrate area, the fingerprint imaging area comprising a photoelectric conversion unit while comprising no light emitting unit, wherein in a case where the bending area is in a bent sate, the fingerprint imaging area is aligned with the fingerprint sensing area, and the fingerprint imaging area is configured to receive an optical signal emitted by the light emitting unit, reflected by a fingerprint and passing through the photic hole, and convert the optical signal to an electrical signal; and
   a fingerprint recognition circuit connected to the fingerprint sensing area and configured to generate a corresponding fingerprint image signal based on the electrical signal output by the fingerprint imaging area,
   wherein the first substrate area, the second substrate area and the bending area are integrally formed, and the bending area is in a bent state such that an orthographic projection of the fingerprint sensing area on the second substrate area at least partially overlaps the fingerprint imaging area.

2. The display panel according to claim 1, wherein the light emitting unit comprises a plurality of the sub-pixels.

3. The display panel according to claim 1, wherein the photic hole comprises a transparent area distributed around a periphery of an area where the sub-pixels are disposed in the display area.

4. The display panel according to claim 1, wherein the photoelectric conversion unit comprises polysilicon, amorphous silicon or indium gallium zinc oxide.

5. The display panel according to claim 1, wherein the fingerprint recognition circuit is disposed on a flexible circuit board.

6. The display panel according to claim 1, wherein an area of the fingerprint imaging area is larger than or equal to an area of the fingerprint sensing area.

7. The display panel according to claim 6, wherein the light emitting unit is an organic light emitting diode unit or a quantum dot light emitting unit.

8. The display panel according to claim 6, wherein each of a shape of the fingerprint sensing area and a shape of the fingerprint imaging area comprises one or more of a circle, a rectangle, or an ellipse.

9. A display device comprising the display panel according to claim 1.

10. A driving method of a display panel, for driving the display panel according to claim 1, wherein the driving method comprises:
providing a driving signal to the light emitting unit to drive the light emitting unit to emit light;
receiving, by the fingerprint imaging area, an optical signal emitted by the light emitting unit, reflected by a fingerprint and passing through the photic hole, and converting the optical signal into an electrical signal; and
generating a corresponding fingerprint image signal by the fingerprint recognition circuit based on the electrical signal.

11. A fingerprint recognition substrate comprising:
a substrate comprising a bending area and a first substrate area and a second substrate area respectively disposed at two sides of the bending area, and the first substrate area, the second substrate area and the bending area being integrally formed;
a light emitting unit, disposed in the first substrate area,
a fingerprint sensing area disposed in the first substrate area, the fingerprint sensing area comprising a photic hole; and
a fingerprint imaging area, disposed in the second substrate area, the fingerprint imaging area comprising a photoelectric conversion unit while comprising no light emitting unit,
wherein in a case where the bending area is in a bent state, an orthographic projection of the fingerprint sensing area on the second substrate area at least partially overlaps with the fingerprint imaging area, and the fingerprint imaging area is configured to receive an optical signal emitted by the light emitting unit, reflected by a fingerprint and passing through the photic hole, and convert the optical signal into an electrical signal.

12. The fingerprint recognition substrate according to claim 11, wherein the photoelectric conversion unit comprises polysilicon, amorphous silicon or indium gallium zinc oxide.

13. The fingerprint recognition substrate according to claim 11, wherein the fingerprint recognition circuit is disposed on a flexible circuit board.

14. The fingerprint recognition substrate according to claim 11, wherein an area of the fingerprint imaging area is larger than or equal to an area of the fingerprint sensing area.

15. The fingerprint recognition substrate according to claim 14, wherein the light emitting unit is an organic light emitting diode unit or a quantum dot light emitting unit.

16. The fingerprint recognition substrate according to claim 14, wherein each of a shape of the fingerprint sensing area and a shape of the fingerprint imaging area comprises one or more of a circle, a rectangle, or an ellipse.

17. A manufacturing method of a display panel, comprising:
providing a flexible substrate having a first substrate area, a bending area, and a second substrate area, wherein the first substrate area and the second substrate area are respectively located at two sides of the bending area, and the first substrate area, the second substrate area and the bending area are integrally formed;
forming a light emitting unit in the first substrate area;
forming a fingerprint sensing area comprising a photic hole in the first substrate area;
forming a fingerprint imaging area in the second substrate area, the fingerprint imaging area comprising a photoelectric conversion unit while comprising no light emitting unit, and in a case where the bending area is in a bent state, an orthographic projection of the fingerprint sensing area on the second substrate area at least partially overlaps the fingerprint imaging area,
wherein the fingerprint imaging area is configured to receive an optical signal emitted by the light emitting unit through the photic hole after the optical signal is reflected by a fingerprint, and convert the optical signal into an electrical signal.

18. The manufacturing method of a display panel according to claim 17, wherein an area of the fingerprint imaging area is larger than or equal to an area of the fingerprint sensing area.

* * * * *